United States Patent [19]

Golstein et al.

[11] 4,424,340

[45] Jan. 3, 1984

[54] PROCESS FOR REMOVING RESIDUAL VINYL CHLORINE FROM THE POLYMER

[75] Inventors: Jean Golstein; Guillaume Coppens; Jean-Claude Davoine, all of Brussels, Belgium

[73] Assignee: Solvay & Cie, Brussels, Belgium

[21] Appl. No.: 412,796

[22] Filed: Aug. 27, 1982

Related U.S. Application Data

[63] Continuation of Ser. No. 260,600, May 6, 1981, abandoned, which is a continuation of Ser. No. 767,836, Feb. 11, 1977, abandoned, which is a continuation of Ser. No. 551,322, Feb. 20, 1975, abandoned, which is a continuation of Ser. No. 378,061, Jul. 11, 1973, abandoned.

[30] Foreign Application Priority Data

Dec. 29, 1972 [BE] Belgium .................. 125979

[51] Int. Cl.³ ........................... C08F 6/00; C08F 6/28
[52] U.S. Cl. ........................... 528/500; 526/345
[58] Field of Search .................................. 528/500

[56] References Cited

U.S. PATENT DOCUMENTS

| | | | |
|---|---|---|---|
| 2,068,424 | 1/1937 | Mark et al. | 260/2 |
| 2,458,636 | 1/1949 | Plambeck | 260/29.6 |
| 3,052,663 | 9/1962 | Bodlaender et al. | 260/92.8 |
| 3,622,553 | 11/1971 | Cines | 260/92.8 |
| 3,625,932 | 12/1971 | Green | 260/92.8 |
| 3,956,249 | 5/1976 | Goodman et al. | 528/500 |

OTHER PUBLICATIONS

Tzschoppe, C. A. 85:193352c, (1976), Ger. Offen. 2,509,937, 9-16-76.
Solvay et Cie, C. A. 80:109076g, (1974), Belg., 793,505, 6-29-73.
Ito et al., C. A. 85:22094r, (1976), Japan, Kokai, 76 26, 988, 3-5-76.
Chem. Eng., (6-5-67), pp. 145-152.
Encyc. Pol. Sci. and Tech., 14, (1971), pp. 339-342.
German Printed Application, Eilers et al., F 11325, ivb/39c, 12-15-55.
Noel et al., C. A. 84:165403f, (1976), Gere. Offen. 2,531,111, 2-26-76.
Arvga et al., C. A. 85:193522H, (1976), Ger. Offen. 2,607,675, 9-2-76.

*Primary Examiner*—Stanford M. Levin
*Attorney, Agent, or Firm*—Spencer & Frank

[57] ABSTRACT

Vinyl chloride and any other comonomers present in a vinyl chloride polymer are removed by heating the polymer to a temperature between its glass transition temperature and 180° C. by directly condensing steam on to the polymer, maintaining the polymer at this temperature sufficiently long to remove the greater part of the monomer or monomers present in the polymer and then cooling the polymer to below its glass transition temperature by evaporating the steam that has condensed on the polymer.

7 Claims, No Drawings

PROCESS FOR REMOVING RESIDUAL VINYL CHLORINE FROM THE POLYMER

CROSS-REFERENCE TO RELATED APPLICATIONS

This application is a continuation of applicants' copending application Ser. No. 06/260,600 filed May 6th, 1981, which is a continuation of U.S. patent application Ser. No. 767,836, filed Feb. 11th, 1977, which abandoned is a continuation of copending U.S. application Ser. No. 551,322, filed Feb. 20th, 1975, which is hereby incorporated by reference and which itself is a continuation of U.S. application Ser. No. 378,061, filed July 11th, 1973, all now abandoned.

The present invention relates to a rapid and economic process for removing the residual monomer or monomers that are present in a vinyl chloride polymer obtained by one of the classic polymerisation processes, more particularly the gas phase process.

It is known that the polymer obtained at the end of polymerisation after venting the unpolymerised monomer still contains an amount of absorbed monomer which varies with the nature of the polymer.

When the amount of residual monomer present in the polymer exceeds about 0.5% by weight, the mechanical properties of extruded products are appreciably reduced, particularly due to the appearance of bubbles of gaseous monomer.

Various methods of removing residual monomer have already been considered but have proved to be ineffective hitherto and, in particular, very uneconomic. For example, it is known to remove the final traces of residual monomer by steam stripping. There is a drawback to this process however in that when it has been carried out an aqueous suspension of the resin is obtained from which the aqueous phase must be separated. The resin must then be dried by conventional methods.

The Applicants have found a method of removing and recovering residual monomer present in the polymer in a rapid, effective and economic manner in which the polymer is recovered dry without any actual drying operations.

The present invention relates to a process for removing vinyl chloride and any comonomers present in a vinyl chloride polymer, which process comprises heating the polymer at a temperature between its glass transition temperature and 180° C., condensing steam directly on to the polymer, maintaining it at this temperature sufficiently long to remove the greater part of the monomer or monomers present in the polymer and then cooling the polymer to below its glass transition point by evaporating the steam that has condensed on the polymer.

By vinyl chloride polymer we mean polyvinyl chloride homopolymer and copolymers of vinyl chloride containing less than 50% by weight of one or more copolymerisable comonomers that may contain if desired additives introduced during polymerisation or immediately before treatment by the process of the invention. These additives may be stabilisers, plasticisers, colouring agents, reinforcing agents and/or processing auxiliaries etc.

When the vinyl chloride polymer is treated in accordance with the process of the invention at a temperature at which there is a risk of irreversible degradation, the addition of a heat stabiliser is indispensable. It may be added during polymerisation or immediately before treatment by the process of the invention. The heat stabilisers or stabiliser mixtures conventionally used for vinyl chloride polymers are suitable here, in particular metal salts of organic or inorganic acids such as Zn, Pb, Ba, Ca and Cd salts, organometallic materials such as organotins, epoxides such as epoxidised oils, etc.

The first stage of the process of the invention consists in heating the polymer by introducing steam which condenses directly on the polymer.

The polymer may also be heated by combining steam heating with one or more conventional heating methods such as hot gas, a heating jacket or heating pipes and by mechanical methods whose operation liberates heat, more particularly suitable stirrers.

These secondary heat sources which may provide useful extra heating when combined with the process of the invention cannot be used alone since they possess both economic and practical drawbacks.

The amount of heat provided by the secondary sources should be appreciably exceed the amount of heat required to evaporate the residual monomer since it is essential that the amount of condensed steam should be sufficient for rapidly cooling the polymer in the next stage of the process. Moreover the amount of condensed steam, allowing for any other additional sources of heat, should be sufficient to raise the polymer to a temperature between the glass transition temperature and 180° C. These results are generally achieved by condensing an amount of steam that corresponds to 1 to 10% by weight of the polymer treated. It is advantageous to use amounts of between 2 and 6% by weight. When the temperature of the polymer has been reached it is maintained sufficiently long for the greater part of the monomer occluded in the polymer to be removed. The duration of this depends on the selected temperature; the higher the temperature the shorter the duration. It is preferable to operate at between 80° and 130° C. The duration is preferably between 5 minutes and 2 hours and more particularly between 10 and 60 minutes.

If the temperature to which the polymer is heated is below the glass transition temperature, removal of the residual monomer is very slow and the process is no longer economic or of industrial significance.

When the polymer, which may contain a heat stabiliser if necessary, is heated at a temperature above 180° C. for a relatively long time, it no longer exhibits after treatment the properties that are required for it to be processed.

The polymer is then cooled to below its glass transition temperature by evaporating the water that condensed during heating. This high speed evaporation can be brought about by the conventional methods, more particularly by the use of a vacuum or by sweeping with a gas such as nitrogen or air.

The temperature during the two stages of the process of the invention, ie the heating and subsequent cooling of the vinyl chloride polymer, is controlled by regulating the pressure.

At the end of these operations the treated polymer can be stored immediately and used without further drying.

The liberated monomer can be recovered after condensation of the steam.

The process forming the object of the present invention can be used either in a tank provided with a stirrer or in a fluidised bed. If a fluidised bed is used it is preferable to condense the steam on the polymer while maintaining the polymer in a fluidised state by means of another gas, more particularly the monomer being polymerised. When the required temperature has been reached the steam no longer condenses completely and can then be used as a fluidisation gas, thus enabling the initial fluidisation gas to be turned off.

The process of the invention can be used with vinyl chloride polymers obtained by the classic polymerisation processes, more particularly bulk, suspension and aqueous emulsion, and in gas phase polymerisation in a fluidised or mechanically agitated bed.

The process of the invention has numerous advantages compared with the known processes. In particular the heating and rapid cooling of the polymer can be easily carried out, which means that the temperature required for removing the residual monomer can be maintained over sufficiently long periods for eliminating the greater part of the occluded residual monomer while avoiding the degradation of the polymer.

Moreover, the process as claimed permits the total and highly economic recovery of the residual monomer occluded in the polymer and results in a dry polymer which can therefore be stored and used without further treatment.

EXAMPLES 1 AND 2

The process according to the invention is carried out with a polyvinyl chloride which, after venting and discharge from the autoclave, contains 34 g of residual vinyl chloride per kg of polyvinyl chloride.

The polyvinyl chloride was obtained by gas phase polymerisation at a temperature of 60° C. and a vinyl chloride partial pressure of 9 kg/cm$^2$ using the process described in Example 1 of the Applicants' Belgian Pat. No. 786 462 of 19.7 1972.

This polyvinyl chloride possesses a glass transition temperature of 80° C.

1 kg of polyvinyl chloride is placed in an autoclave provided with a jacket and a stirrer. After applying a vacuum in order to obtain a residual pressure of 430 mm Hg$_a$, steam is introduced at 90° C.

The polyvinyl chloride which was originally at a temperature of 30° C. heats up rapidly in contact with the steam which condenses on it.

When the polyvinyl chloride has reached a temperature of 85° C., ie the temperature corresponding to the dew point of steam at the operating pressure, the steam virtually ceases to condense and is removed directly by the vacuum system.

To avoid secondary condensation due to the walls of the autoclave the latter are maintained at the same temperature as the polymer during the heating cycle.

After heating, the polyvinyl chloride contains about 3% by weight of condensed water.

After 30 minutes the polyvinyl chloride is cooled to a temperature below its glass transition temperature, ie 40° C., by applying a vacuum to the autoclave until the residual pressure is 55 mm Hg$_a$.

The steam and the vented vinyl chloride are separated by condensation. 28 g of water and 31 g of vinyl chloride are recovered in this way.

The resulting polyvinyl chloride only contains 3 g of residual vinyl chloride, ie more than 90% of the residual vinyl chloride occluded in the polyvinyl chloride have been removed.

For purposes of comparison, the same experiment was repeated by heating the polymer for 30 minutes and 2 hours respectively at a temperature of 60° C. (ie a temperature below the glass transition temperature of the polymer), admitting steam at 65° C. and maintaining a pressure of 150 mm Hg$_a$ in the autoclave, which corresponds to the dew point of steam at 60° C.

The polyvinyl chloride recovered after 30 minutes' heating at 60° C. still contains 32 g of vinyl chloride which is equivalent to the removal of less than 10% residual vinyl chloride.

The polyvinyl chloride recovered after 2 hours' heating at 60° C. contains 29 g of vinyl chloride which is equivalent to the removal of less than 20% residual vinyl chloride.

EXAMPLES 3 AND 4

The process of the invention is carried out on a vinyl chloride/propylene copolymer containing 3% of copolymerised propylene and obtained by gas phase polymerisation at a temperature of 53° C. using the process described in Example 1 of the Applicants' Belgian Pat. No. 785 608 of 29.6.1972.

The resulting copolymer has a glass transition temperature of 75° C.

1 kg of vinyl chloride/propylene copolymer containing 28 g of vinyl chloride and 15 g of propylene as residual monomers is introduced into an autoclave.

2 parts of tribasic lead sulphate, 1 part of dibasic lead stearate, 0.5 parts of calcium stearate and 0.3 parts of stearic acid are then introduced per 100 parts of resin.

The whole is heated to 115° C. by adding steam superheated to 120° C. and the pressure in the autoclave is maintained at 1270 mm Hg$_a$ which corresponds to the dew point of steam at 115° C. When the temperature of 115° C. is reached the steam no longer condenses and the flow of steam is stopped.

After 10 minutes at 115° C. the product is subjected to a vacuum and cooled to a temperature of 50° C.

The recovered product only contains 0.5 g of residual vinyl chloride and 0.1 g of residual propylene, which is equivalent to the removal of 98% and 99% of the residual monomers respectively.

For purposes of comparison the same experiment was repeated, but the steam was admitted at 65° C. and a pressure of 150 mm Hg$_a$ was maintained, which corresponds to the dew point of steam at 60° C.

After 10 minutes a product containing 27 g of vinyl chloride and 13 g of propylene was obtained, thus indicating that a negligible amount of the residual monomers had been removed.

What is claimed is:

1. In a process for removing by steam stripping residual vinyl chloride and any other residual comonomers present in vinyl chloride polymer, which polymer is a vinyl chloride homopolymer or a copolymer of vinyl chloride containing less than 50% by weight of one or more copolymerizable comonomers, the improvement consisting of removing residual vinyl chloride and any other residual comonomers occluded in the vinyl chloride polymer by heating the vinyl chloride polymer to a temperature between its glass transition temperature and 180° C. by condensing steam onto the polymer, maintaining the vinyl chloride polymer at a temperature between its glass transition temperature and 180° C. sufficiently long to remove by steam stripping the greater part of the monomer or monomers present in the vinyl chloride polymer, and then cooling the vinyl chloride polymer to below its glass transition temperature by evaporating the water that condensed during heating.

2. The process according to claim 1, wherein the steam stripping is carried out in a fluidised bed and the polymer is maintained in a fluidised state by means of a gas.

3. The process according to claim 1, wherein the vinyl chloride is removed from a vinyl chloride homopolymer obtained by gas phase polymerisation.

4. The process according to claim 1, wherein vinyl chloride and propylene are removed from a vinyl chloride/propylene copolymer obtained by gas phase polymerisation.

5. The process according to claim 1, wherein the amount of steam condensed onto the polymer is from 1 to 10% by weight of the polymer.

6. The process according to claim 5, wherein the amount of steam condensed onto the polymer is from 2 to 6% by weight of the polymer.

7. The process according to claim 1, wherein the polymer is maintained at a temperature between 80° and 130° C.

* * * * *

UNITED STATES PATENT AND TRADEMARK OFFICE
CERTIFICATE OF CORRECTION

PATENT NO. : 4,424,340

DATED : January 3, 1984

INVENTOR(S) : Jean Golstein et al

It is certified that error appears in the above-identified patent and that said Letters Patent is hereby corrected as shown below:

In the heading of the patent, under [54], in line 2 of the title, change "CHLORINE" to --CHLORIDE--.

Signed and Sealed this

Twenty-ninth Day of May 1984

[SEAL]

Attest:

GERALD J. MOSSINGHOFF

Attesting Officer

Commissioner of Patents and Trademarks